(12) United States Patent
Wuethrich et al.

(10) Patent No.: US 9,424,474 B2
(45) Date of Patent: Aug. 23, 2016

(54) METHOD FOR DETERMINING THE LENGTH OF A QUEUE

(71) Applicant: XOVIS AG, Bern (CH)

(72) Inventors: Martin Wuethrich, Bruegg BE (CH);
Christian Studer, Flumenthal (CH);
David Studer, Bruegg BE (CH);
Markus Herrli, Allmendingen b. Bern (CH)

(73) Assignee: XOVIS AG, Zollikofen (CH)

( * ) Notice: Subject to any disclaimer, the term of this patent is extended or adjusted under 35 U.S.C. 154(b) by 56 days.

(21) Appl. No.: 14/409,881

(22) PCT Filed: Jun. 13, 2013

(86) PCT No.: PCT/CH2013/000105
§ 371 (c)(1),
(2) Date: Dec. 19, 2014

(87) PCT Pub. No.: WO2013/188988
PCT Pub. Date: Dec. 27, 2013

(65) Prior Publication Data
US 2015/0324647 A1 Nov. 12, 2015

(30) Foreign Application Priority Data
Jun. 20, 2012 (EP) .................... 12405058

(51) Int. Cl.
*G06K 9/00* (2006.01)
*G06T 5/40* (2006.01)
*G06T 7/40* (2006.01)
*G06T 7/20* (2006.01)
*G06T 1/60* (2006.01)

(52) U.S. Cl.
CPC ........ *G06K 9/00771* (2013.01); *G06K 9/00369* (2013.01); *G06T 1/60* (2013.01); *G06T 5/40* (2013.01); *G06T 7/2093* (2013.01); *G06T 7/408* (2013.01)

(58) Field of Classification Search
None
See application file for complete search history.

(56) References Cited

U.S. PATENT DOCUMENTS

| | | | | |
|---|---|---|---|---|
| 5,465,115 A * | 11/1995 | Conrad | ............. | G06K 9/00778 348/155 |
| 5,550,928 A * | 8/1996 | Lu | ..................... | G06K 9/00221 382/103 |
| 5,953,055 A * | 9/1999 | Huang | .............. | G06K 9/00228 348/149 |
| 5,973,732 A * | 10/1999 | Guthrie | ............. | G06K 9/00778 348/150 |
| 6,496,595 B1 * | 12/2002 | Puchek | .............. | G06K 9/00973 340/5.8 |
| 6,654,047 B2 * | 11/2003 | Iizaka | ................... | H04N 7/181 348/143 |
| 6,697,104 B1 * | 2/2004 | Yakobi | ............... | G06K 9/00778 348/143 |
| 6,747,687 B1 * | 6/2004 | Alves | ..................... | H04N 7/188 340/932.2 |
| 6,987,885 B2 * | 1/2006 | Gonzalez-Banos | | G06K 9/00778 382/103 |
| 7,167,576 B2 * | 1/2007 | Steenburgh | ........ | G06K 9/00778 348/150 |
| 7,612,796 B2 * | 11/2009 | Lev-Ran | ........... | G06K 9/00369 348/143 |
| 7,652,687 B2 * | 1/2010 | Sorensen | ................ | G07C 9/00 348/150 |
| 7,688,212 B2 * | 3/2010 | Farley | ..................... | G08B 7/06 116/4 |
| 7,688,349 B2 * | 3/2010 | Flickner | ............. | G06K 9/00362 348/150 |
| 7,692,684 B2 * | 4/2010 | Ku | ........................... | G07C 9/00 348/169 |
| 7,944,358 B2 * | 5/2011 | Sorensen | ................ | G07C 9/00 340/539.13 |
| 8,229,781 B2 * | 7/2012 | Zenor | ................... | G06Q 30/02 705/7.31 |
| 8,239,277 B2 * | 8/2012 | Lee | .................. | G06Q 10/06316 340/539.13 |
| 8,564,661 B2 * | 10/2013 | Lipton | ............. | G08B 13/19608 348/143 |
| 8,711,217 B2 * | 4/2014 | Venetianer | .......... | G06F 17/3079 348/143 |

| | | | | |
|---|---|---|---|---|
| 8,731,241 | B2 * | 5/2014 | Johnson | G06K 9/00771 |
| | | | | 348/143 |
| 8,873,794 | B2 * | 10/2014 | Sorensen | G06K 9/00771 |
| | | | | 382/100 |
| 9,286,775 | B2 * | 3/2016 | Mori | G08B 13/19608 |
| 9,288,268 | B2 * | 3/2016 | Ramaswamy | H04L 67/12 |
| 2013/0295588 | A1 * | 11/2013 | Watkins | G01N 33/56972 |
| | | | | 435/7.24 |

FOREIGN PATENT DOCUMENTS

| | | |
|---|---|---|
| EP | 2 104 077 A2 | 9/2009 |
| JP | 2001-291184 A | 10/2001 |
| WO | WO 2005/062714 A2 | 7/2005 |
| WO | WO 2010/055286 A1 | 5/2010 |

OTHER PUBLICATIONS

Coifman et al., "Vehicle Reidentification and Travel Time Measurement, Part 1: Congested Freeways", 2001 IEEE Intelligent Transportation Systems Conference Proceedings—Oakland (CA), USA—Aug. 25-29, 2001, pp. 138-143.

Kwong at al., "Arterial travel time estimation based on vehicle re-identification using wireless magnetic sensors", Transportation Research Part C, vol. 17 (2009), pp. 586-606.

\* cited by examiner

*Primary Examiner* — Randolph I Chu

(74) *Attorney, Agent, or Firm* — Birch, Stewart, Kolasch & Birch, LLP

(57) ABSTRACT

Method for determining the length of a queue of objects in a predefined region having at least one entrance and at least one exit, in the course of which errors in the acquisition of objects entering or exiting the region are corrected during the determination of the length of the queue. In a first step, a specific entry signature E of each object entering the predefined region through the at least one entrance is determined with the aid of at least one first image sensor. Thereafter, the specific entry signature E is stored in an entry list of a calculation unit, each entry signature E being provided with an index value i reflecting the temporal sequence of the entries. In addition, a value L reflecting the length of the queue of the objects is increased by one. Furthermore, a specific exit signature A of an object exiting the predefined region through the at least one exit is determined with the aid of at least one second image sensor, the specific exit signature A being stored in an exit list of a calculation unit as exit signature $A_0$ with index value $j=0$. The index value of exit signatures $A_j$ already present in the exit list is respectively increased by one, and exit signatures $A_j$ which have an index value j that is greater than a predeterminable value M are deleted from the exit list. Subsequently, similarity values $C_n$ for $-N \leq n \leq +N$ are calculated with the aid of the calculation unit, N being a predeterminable value which defines a specific number N of entry signatures of objects which, before or after the object with the entry signature $E_L$ which next exits the predefined region on the basis of the length of the queue L, will exit or have already exited the predefined region. In the process, similarity metrics $U_{mn}$ are respectively calculated between an exit signature $A_m$ and an entry signature $E_{L+m+n}$, M running from 0 to M, and added to $C_n$. The value L is decremented by the value one. Subsequently, the similarity values $C_n$ are compared with the similarity value $C_0$. The value L is corrected by adding the index value x given the presence of a value $C_x$ with index value n=x that indicates a higher similarity than the similarity value $C_0$.

20 Claims, 2 Drawing Sheets

METHOD FOR DETERMINING THE LENGTH OF A QUEUE

TECHNICAL FIELD

The invention relates to a method for determining the length of a queue of objects in a predefined region having an entrance and an exit, and a device suitable for carrying out said method.

PRIOR ART

U.S. Pat. No. 7,167,576 (Point Grey Research) describes a method for monitoring the entry and exit of objects in a region, a signature being created for each object. Image data are used for the signatures, in particular color histograms of the objects which are determined over a single frame or also averaged over a plurality of frames. During matching of the signatures, an acquired exit signature is compared with the stored entry signatures, signatures with the best correlation being made. For each object, the entry and exit times are stored with the signature, the dwell time of an object in the region being calculated using its entry and exit times. For certain applications, in order to improve the matching, it is possible to use an expected period for the staying of an object as weighting factor, signatures which lie outside said period receiving less weight during the matching than values which lie within said period.

EP 2 104 077 (Ehlert-Doumont Dirk) discloses a system for determining the number of visitors in assembly rooms, a signal being transmitted to a central computer via a calculating unit at each entrance and exit by means of a signal generator for each visitor entering or exiting. The central computer determines the occupancy of the assembly room. Hand signal generators are preferably provided as signal generators. It is proposed as an alternative to use other signal generators such as, for example, foot mats, cameras, lasers or light barriers. As feedback, it is signaled via a traffic light system to staff at the entry points to the assembly room whether more people may be admitted given the current occupancy, or the current visitor number is displayed via screens.

WO 2005/062714 (Countwise LLC) describes a system for detecting and counting people who pass through an area. The system comprises at least one terminal which has at least two CCD cameras or a camera which can monitor two regions. Color variations with reference to the background are required by the cameras in order to detect people. In a matching step, it is determined whether an object detected by a color variation is already present in the memory of the system. The system can determine by this matching whether what is involved is an object that is entering the monitored region or leaving said region, or whether an object which remains in the region is involved. The system has various counters which can be used to count the objects that pass through the region, or which leave the region at a specific location.

JP 2001-291184 (Faasuto Create KK) discloses a system for automatic evaluation of a volumetric flow of objects in a defined region. A multiplicity of cameras monitors said region. Signatures of the individual acquired objects are compared with stored signatures in order to determine whether the acquired object belongs to the objects to be counted. In the event of correspondence, a still image of the object is stored in a database. The volumetric flow of the objects can be determined by counting the still images.

It is a disadvantage of the cited systems that errors in the acquisition of the objects are not detected by the systems, which means that the actual occupancy or the actual length of the queue (that is to say the number of objects in the queue) can deviate from the calculated value. In particular, given a high number of objects that can enter or exit the monitored regions, it can happen that objects closely following one another cannot be distinguished from one another and are recognized by a counting system as only one object. Even if the error rate turns out to be relatively low, if there is a high flow of objects the difference of the calculated occupancy, or the calculated length of the queue, will deviate substantially from the actual value after some time.

SUMMARY OF THE INVENTION

It is an object of the invention to provide a method belonging to the technical field mentioned at the beginning in which there is automatic correction of errors in the acquisition of objects entering or exiting a region during the calculation of the length of a queue.

The achievement of the object is defined by the features of claim 1. In accordance with the invention, a specific entry signature $E_i$ of each object entering the predefined region through the at least one entrance is determined with the aid of at least one first image sensor. The specific entry signature $E_i$ is stored in an entry list of a calculation unit, each entry signature $E_i$ being provided with an index value i reflecting the temporal sequence of the entries. Furthermore, a value L reflecting the length of the queue (and therefore the number of objects in the queue) is increased by one.

With the aid of at least one second image sensor, a specific exit signature A is determined of an object exiting the predefined region through the at least one exit. The specific exit signature A is stored in an exit list of the calculation unit as exit signature $A_0$ with index value j=0. The index value of exit signatures $A_j$ already present in the exit list is respectively increased by one to $A_{j+1}$, exit signatures $A_{j+1}$ which have an index value that is greater than a predeterminable value M being deleted from the exit list. The exit list therefore displays the sequence of the last M objects which have passed out of the predefined region.

Subsequently, the calculation unit is used to calculate similarity values $C_n$ for $-N \leq n \leq +N$. N is a predeterminable value which defines a specific number N of entry signatures of objects which, before or after the object with the entry signature $E_L$ will exit, or have already exited the predefined region, the entry signature $E_L$ representing the signature of that object whose exit is next expected on the basis of the length of the queue L. Similarity metrics $U_{mn}$ are respectively calculated between an exit signature $A_m$ and an entry signature $E_{L+m+n}$ in order to calculate the similarity values. In this case, m runs from 0 to M. The similarity metrics $U_{mn}$ are added in order to calculate the similarity values $C_n$.

The predeterminable value N depends on the expected error rate of the sensors used. The value N preferably corresponds to the maximum number of signatures in which no error is to be expected because of the error rate of the sensors.

Expressed as a formula, the calculation of the similarity values $C_n$ is performed in accordance with:

$$C_n = \sum_{m=0}^{M} U_{mn} = \sum_{m=0}^{M} F(E_{L+m+n}, A_m),$$

F representing a function for determining the similarity metric.

The function used is a modification of the cross-correlation function between the entry signatures and the exit signatures, which is known to a person skilled in the art. Consequently, in the method according to the invention it is not similarity values between individual signatures that are determined, but rather it is the similarity between two signature sequences, each consisting of a plurality of signatures, that is calculated.

It is possible in principle to use any suitable function to calculate the similarity metrics $U_{mn}$. Depending on the signatures used, another function will be best suited for determining the similarity metrics $U_{mn}$.

After the calculation of the similarity values $C_n$, the value L is decremented by one. The length of the queue determined by the method is therefore reduced by the exiting object.

In a last step, the value L is corrected by comparing the similarity values $C_n$ with the similarity value $C_0$. Given the presence of a value $C_x$ with index value n=x that indicates a higher similarity than the similarity value $C_0$, the value L is corrected by adding the index value x.

The similarity value $C_0$ corresponds to the similarity value for which the similarity metrics are calculated between the signatures $A_0$ to $A_M$ with $E_L$ to $E_{L+M}$, n=0. In the case of error-free acquisition of all entry signatures and all exit signatures, said signatures should correspond exactly to one another, that is to say the calculated similarity value should be the maximum. However, if another similarity value $C_x$ indicates a greater similarity, it can then be concluded that the sequence of the exit signatures in the exit list no longer corresponds to the sequence of the entry signatures in the entry list of $E_L$ to $E_M$. The signatures are displaced by x "places" in the entry list one against the other. This indicates that the entry sensor or the exit sensor does not acquire individual object signatures, or does so incorrectly. In order to bring the two signature sequences of the exit list and the entry list of $E_L$ to $E_M$ into correspondence, the value L is corrected by the value of x by adding the latter.

The entry signatures $E_i$ in the entry list can be enumerated continuously via the index value i such that the last acquired entry signature has the highest index value $i_{max}$. The entry signature $E_L$ corresponds to $E_{imax-L}$ given this indexing.

The indexing of the entry signatures $E_i$ in the entry list is, however, preferably performed similarly to the indexing of the exit list. The last acquired entry signature receives the index value i=0, while the index values of all entry signatures $E_i$ already present in the entry list are increased by one to $E_{i+1}$. In this indexing, $E_L$ corresponds to the entry index $E_i$, for which i=L.

In order to save memory location, the number of the entry signatures $E_i$ stored in the entry list can be limited. In order to be able to carry out the method according to the invention, however, at least L+M+N of entry signatures $E_i$ should be stored in the entry list.

According to a comparison of individual signatures with one another, the method according to the invention has the advantage that statistically much more robust values can be obtained by the calculation of similarity values of an exit list with a plurality of exit signatures with a list of entry signatures.

Depending on the angle of the objects to the sensors, it can happen that the entry signature $E_i$ and the exit signature A of the same object differ. By appropriately placing the sensors, the influence of the angle to the objects on the acquired signature can be minimized. The signatures can also be calculated from a plurality of consecutive recorded images (frames), the result being the generation of an averaged signature of the object for which different angles between object and sensor exercise on the signature less strongly.

In the present application, a "better" similarity value is understood to mean that the "better" value indicates a greater correspondence of the signatures than a "worse" value. Depending on the similarity metric used, a smaller value in the comparison of two similarity values can indicate a greater correspondence of the signatures, or vice versa.

The length of the queue results from the value L which is increased or reduced, respectively, by the value one for each entrance and exit of an object. In addition, when the exit list is displaced against the entry list said value is corrected in order to correct acquisition errors of the optical sensors used in determining the length L of the queue.

The entry list displays the queue in the predefined region, it being possible for each object to be unambiguously identified using the stored entry signature.

The method according to the invention permits errors in the sequence of the exiting objects with reference to the sequence of the entering objects to be determined using a comparison of similarity values of signatures of the exit list with a specific number of signatures of the entry list. The length of a queue can be determined precisely by the subsequent correction of the value L, acquisition errors of the optical sensors being corrected.

The calculated similarity values $C_n$ are preferably summed to form corresponding histogram values $K_n$ of a histogram list. A correction of the value L is correspondingly performed only once a histogram value $K_x$ with index value n indicates a higher similarity than the histogram value $K_0$.

By summing similarity values $C_n$ determined in a plurality of calculation rounds to form a histogram value $K_n$, it is possible not only to undertake a correction of the value L using a single comparison of the exit list with the entry list, but to base said correction on a trend value.

It is preferred to calculate the similarity values $C_n$ not after each exit of an object from the predefined region, but respectively only after a predeterminable number of exits. In particular, the similarity values $C_n$ are calculated only respectively after five, ten or fifteen acquired exit signatures A.

Since the objects are moved forward in the queue only one "place" after each exit, the similarity values of two consecutive calculations will exhibit only a slight difference. By contrast, if there is a new calculation of the similarity values $C_n$ after some objects have exited the predefined region (and, correspondingly, also some have entered), the calculated similarity values $C_n$ will exhibit greater differences which can be detected correspondingly more easily.

Depending on the field of application, the interval between the calculations can be selected differently. For example, if objects are to be detected for which similar signatures are to be expected in most cases, a correspondingly larger interval is selected because there is then a greater probability in the case of two consecutive calculations of the similarity values $C_n$ to have an object in the exit list or in the region $E_{L+N}$ of the entry list which has a signature with a stronger difference than the other objects.

Preferably, a correction of the value L is performed only if a similarity value $C_x$ or a histogram value $K_x$ indicates a higher similarity which is at least higher by a predeterminable value Q than the similarity value $C_0$ or the histogram value $K_0$, respectively.

The stipulation of a value Q by which a similarity value $C_x$ or a histogram value $K_x$ has to be at least better in order to cause a corresponding correction of the value L ensures that a correction is performed only when there is a clear difference between two values. This prevents merely random or statistically not unambiguous differences between two similarity values or histogram values from leading to an erroneous correction of the value L. The reliability of the method according to the invention is additionally increased thereby.

The factor Q is a function of the similarity metric used, and of the selected scalings thereof. In addition, the sensitivity of the method can be set via the factor Q.

The objects are preferably people in the method according to the invention. Extremely varied methods are known for acquiring optical signatures for people. For example, an unambiguous signature can be generated by a face recognition algorithm by using the images of people acquired by the at least two image sensors. Furthermore, it is also possible to use the different textures of the objects as signature. As a further example, it is also possible to use a length extension of the object, for example the size of a person or the length of a vehicle, as signature.

In particular, the method according to the invention is therefore suitable for determining numbers of people in a queue. Studies have shown that people find the waiting time substantially more pleasant when they are provided with an approximate specification of the likely waiting time. Consequently, the method is suitable for using the length L of the queue to calculate the waiting time to be approximately expected, and output it.

Alternatively, the method according to the invention can also be used to count other objects, for example the number of vehicles which are located on a specific road segment.

It is preferred that entry signatures $E_i$ and exit signatures A acquired by the image sensors are color signatures of the objects. In contrast to other image signatures, color signatures can be determined relatively quickly and with relatively less arithmetic capability. Various suitable algorithms for determining color signatures are known to the person skilled in the art. An exemplary overview of suitable algorithms is found, for example, in Y. Rubner et al.: *The Earth Mover's Distance as a metric for Image Retrieval*"; *International Journal of Computer Vision*; 40(2); 99-121; 2000.

It is particularly preferred to use color mean values of the objects as color signatures. Such color signatures consist only of three mean values for the primary colors red, green and blue. In comparison to other image signatures, the use of color mean values is much less complicated and does not require as much computing power. Nevertheless, signatures with color mean values have sufficient power of distinction in order to be able to distinguish individual objects reliably from one another.

The similarity metrics $U_{mn}$ are preferably calculated using a distance vector between the exit signature $A_m$ and the entry signature $E_{L+m+n}$ in a multidimensional color space. In particular, the calculation is performed in a three-dimensional color space.

The exit signature $A_m$ and the entry signature $E_{L+m+n}$ can be represented in any desired color space such as, for example, the RGB, the HSL, YCbCr or a spherical color space.

The distance vector can alternatively further be converted into a quality metric so that small similarity metrics, that is to say signatures which are far apart from one another in the color space, are given less weight than signatures which are situated nearer one another in the color space. It has been shown experimentally that an exponential function is particularly suitable for this purpose:

$$P = \exp(-\alpha |\overline{D}^2|),$$

P representing the quality metric between the entry signature $E_{L+m+n}$ and the exit signature $A_m$, and D representing the distance vector between the entry signature $E_{L+m+n}$ and the exit signature $A_m$ in the three-dimensional color space.

In addition, the calculation of the quality metric can be further adapted experimentally to determining scaling factor α by using at the location of use a device suitable for carrying out the method.

The distance vector or the quality metric can subsequently be used as similarity metric.

The similarity metrics are preferably determined by an earth-movers-distance algorithm. Extremely varied suitable methods are known to the person skilled in the art for calculating similarity metrics between two image signatures. An exemplary overview of suitable methods is found, for example, in Y. Rubner et al.: *The Earth Mover's Distance as a metric for Image Retrieval*"; *International Journal of Computer Vision*; 40(2); 99-121; 2000.

It is preferred that, on the basis of the determined length L of the queue, an estimated dwell time is calculated for objects newly entering the predefined region and is output. The estimated waiting time is preferably displayed by a display device at at least one entrance.

By way of example, the estimated waiting time can be determined using empirically determined average waiting times for specific queue lengths. Alternatively, it is also possible to measure an average time between two exits of objects at the exit, and to use said value to calculate the dwell time to be expected in the predefined region. It is possible to make use in this case as display device of a display panel, a display or any other suitable display device. By way of example, the display device can inform people about the estimated waiting time in a queue such as for example in front of a counter or at a security control.

It is preferred that in addition to the entry signature $E_i$ the entry time $T_i$ is stored for each object entering the predefined region. An average dwell time of the objects is calculated using the stored entry times $T_i$ and the exit times of the objects and preferably output. The determined average dwell times of the objects can be used, for example, for statistical evaluations.

In order to reduce the effect of different lighting conditions, the entry signatures $E_i$ or the exit signatures A can be varied with a correction algorithm before being stored or being used for the calculation of a similarity metric $U_{mn}$. In this case, the correction algorithm must be calibrated with the prevailing lighting conditions before the application of the method according to the invention, depending on location of use. The correction algorithm can also be designed in this case in such a way that not only does it compensate light effects arising on account of the different locations of the sensors, but that lighting conditions changing respectively with time of day are also corrected. Such a calibration of the correction algorithm is preferably performed by correlation of signatures of at least one calibration object in the entrance and exit of the predefined region, it being possible to adapt the correction algorithm by determining the deviations of the acquired signatures relative to one another or to a calibration signature of the calibration object.

An exemplary correction algorithm is described in B. Prosser et al: *"Multi-camera Matching under Illumination Change over Time"*; *Workshop on Multi-camera and Multi-modal Sensor Fusion Algorithms and Applications*-M2SFA2; 2008.

A further aspect of the present invention relates to a device for determining the length of a queue of objects in a predefined region having an entrance and an exit in accordance with the method according to the invention. The device comprises at least two image sensors. They are arranged in such a way that at least one first image sensor detects objects entering the region through the entrance, and at least one second image sensor detects objects exiting the region through the exit. Furthermore, the device has a calculation unit which calculates the length of the queue of the objects in the predefined region using the detected entering and exiting objects. The calculation unit or the image sensors are configured in such a way that a specific signature is determined for each entering and exiting object.

The entry and exit signatures can either be acquired directly in the at least two image sensors and subsequently passed onto the calculation unit. In this case, the at least two image sensors must have suitable means for determining appropriate signatures from the recorded images, for example a microchip.

Alternatively, the calculation unit can determine the entry and exit signatures by using the images obtained by the at least two image sensors. This permits the use of relatively simple and commercially available image sensors. The calculation unit is preferably equipped with various interfaces in order to be compatible with a plurality of commercially available image sensors.

The calculation unit is preferably a computer which is equipped with appropriate software. Alternatively, the calculation unit can also consist of an integrated circuit which is designed to execute the method according to the invention.

The image sensors transmit signature data or image data, respectively, to the computer unit, preferably via a network. This can be any desired network which has an adequate data transfer performance in order to enable the data to be transmitted with as little delay as possible from the at least two image sensors to the calculation unit. It is preferably a wired LAN (Local Area Network) which is based on the Ethernet specifications. Furthermore, the data can also be transmitted via a wireless network which is preferably based on the IEEE 802.11 Standard. In order to ensure the required data security, a suitable encryption of the data should be used in the case of wireless transmission. It is also possible for a plurality of devices according to the invention to be connected to a single calculation unit in the case of data transmission via a network, the image sensors being assigned to specific, different predefined regions by using the network addresses thereof. Alternatively, the image sensors can also be connected directly to the calculation unit, for example via coaxial cable or fiber optic cable.

The at least two image sensors are preferably digital cameras. Digital images are particularly well suited for acquiring the entry and exit signatures, since said signatures can be processed by the calculation unit without prior conversion. Moreover, digital cameras are available on the market with the most varied resolutions and optics, and so it is possible to use a suitable digital camera depending on the field of use for the device according to the invention.

Alternatively, it is also possible to use other image sensors such as, for example, a "PT1 Vision Sensor" marketed by the applicant.

The at least one calculation unit is preferably integrated in at least one of the image sensors. This permits the device to have as simple a design as possible, since no additional equipment need be installed for the calculation unit. The calculation unit can be physically attached to at least one image sensor, for example as a snap-on module. However, it is also alternatively possible for there to be integrated in the at least one image sensor itself an appropriate circuit which serves as calculation unit. It can also be provided that all the image sensors have an appropriate calculation unit, it being possible during use in each case for one image sensor to be configured as master image sensor which carries out the calculation or coordinates the calculation units of the other image sensors during the calculation.

A further aspect of the present invention resides in the use of the above-described method according to the invention to operate a device for determining the length of a queue in a predefined region.

The determination of the length of a queue can be performed very accurately owing to the use of the method according to the invention, since acquisition errors of the image sensors are corrected such that the calculated length corresponds to the actual length.

Further advantageous embodiments and combinations of features of the invention emerge from the following detailed description and the totality of the patent claims.

BRIEF DESCRIPTION OF THE DRAWINGS

In the drawings used to explain the exemplary embodiment.

In principle, identical parts are provided with the same reference numerals in the figures.

WAYS OF CARRYING OUT THE METHOD

Figure 1:
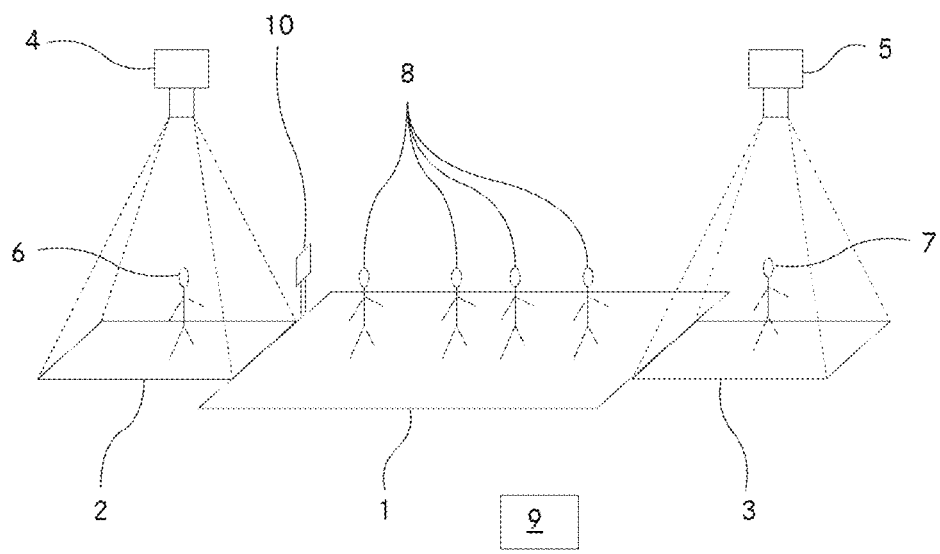
FIG. 1 shows a schematic illustration of a device according to the invention.

FIG. 1 shows a device according to the invention in a schematic view. The device has an entry image sensor 4 which is arranged so as to be able to detect object 6 entering a defined region 1 through an entrance 2. The device further comprises an exit image sensor 5 which is arranged so as to be able to detect object 7 exiting the predefined region 1 through an exit 3. The objects 6, 7, 8 are illustrated as people in the present example. The device further has a calculation unit 9 which receives image data transmitted by the entry image sensor 4 and the exit image sensor 5, and calculates the length L of the queue of the objects 8 in the predefined region 1.

The transmission of the image data is preferably performed via a network (not illustrated). The calculation unit 9 uses the transmitted image data to determine for each entering object 6 an entry signature $E_i$ which is stored in an entry list. An exit signature A is determined for each detected exiting object 7 by using the image transmitted by the exit image sensor 5 to the calculation unit and is stored in an exit list.

Given error-free operation of the two image sensors 4, 5 and a linear movement of the objects 8 in the predefined region 1, in order to calculate the length L of the queue of the objects 8 it is possible to calculate by subtraction the number of acquired exiting objects 7 from the number of the acquired entering objects 6. Since, however, errors usually occur in the acquisition by the image sensors 4, 5, it can happen that entering or exiting objects 6, 7 are not acquired, or are acquired twice. It can also happen that individual objects 8 overtake one another in the predefined region 1. In order to correct such errors in the determination of the length L of the queue, upon an exit of an object 7 the calculation unit 9 calculates similarity values $C_n$ between the exit list and a region of the entry list with N objects which have exited the predefined region 1 before the last acquired exiting object 7, and N objects entering the predefined region 1 after said object. Given error-free acquisition of the entering objects 6 and the exiting objects 7 by the optical sensors 4, 5, the sequence of the objects in the exit list should correspond with the sequence of the N objects which exited the predefined region 1 before the last object exited the predefined region 1. If the calculation unit identifies a displacement of the sequence with the aid of the calculated similarity values $C_n$, the length L of the queue is appropriately corrected.

Figure 2:
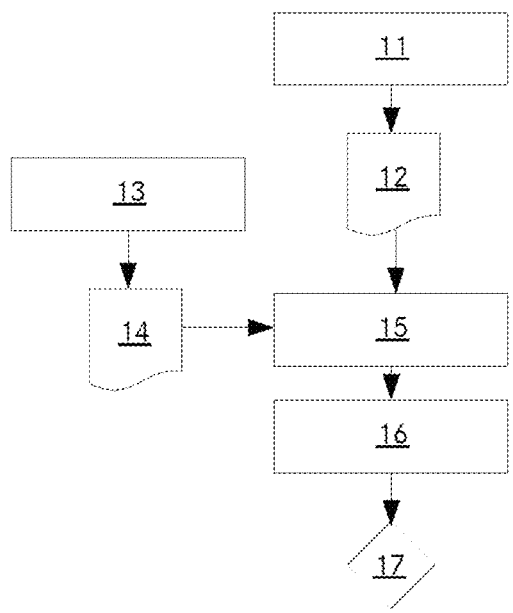
FIG. 2 shows a flowchart of the method according to the invention.

FIG. 2 shows a schematic illustration of an embodiment of the method according to the invention. An entry signature $E_i$ is acquired from an entering object 6 in an entry acquisition step 11. It is preferred to calculate from the entering object 6 a color mean value for the three primary colors red, blue and green. Said entry signature $E_i$ is subsequently stored in the entry list 12. The acquisition of an entry signature $E_i$ together with its storage in the entry list 12 is performed for each entering object 6. In the process, each entry signature $E_i$ receives an index value i reflecting the sequence of its entry. As a result, it is possible for the sequence of the entering objects 6 in the predefined region 1 to be simulated in the entry list 12. In addition, a value L which reflects the length of the queue of the objects 8 in the predefined region 1 is increased by the value one. It is preferred to delete the entry list 12 before each start-up of a device suitable for carrying out the method, and for the value L to be reset to an initial value.

An exit signature A is acquired in an exit acquisition step 13 for each exiting object 7. The acquisition of the exit signature A is performed with the same method as the acquisition of the entry signatures $E_1$. Each acquired exit signature A is stored in an exit list 14. The signature of the last acquired exiting object 7 is preferably stored as signature with the index value j=0, that is to say as $A_0$. The index values of exit signatures $A_j$ already stored in the exit list are increased to $A_{j+1}$ by the value one. In addition, exit signatures with an index value greater than a predeterminable value M are deleted from the exit list.

In the subsequent calculation step 15, similarity values $C_n$ are calculated for $-N \leq n \leq +N$. N is a predeterminable value which defines a specific number N of entry signatures of objects which will exit, or have already exited, the predefined region before or after the object with the entry signature $E_L$, the object with the entry signature $E_L$ being that object whose exit is next expected on the basis of the length of the queue L. In order to calculate the similarity values $C_n$, similarity metrics $U_{mn}$ are respectively calculated between an exit signature $A_m$ and an entry signature $E_{L+m+n}$, m running from 0 to M. The similarity metrics $U_{mn}$ are subsequently added to the similarity values $C_n$. The similarity value $C_n$ thus reflects the overall similarity of the exit signatures in the exit list $A_0$ to $A_M$ against the subgroups of entry signatures from $E_{L+n}$ to $E_{L+n+m}$ for each $-N \leq n \leq +N$.

In the next step 16, the value L is decremented by the value one. This takes account of the circumstance that the length L of the queue in the predefined region 1 has been reduced by an object 8 as a result of the exit of the object 7.

In the subsequent correction step 17, the similarity values $C_n$ are compared with the similarity value $C_0$. The value L is corrected by addition of the index value x in the presence of a value $C_x$ with index value n=x which indicates a higher similarity than the similarity value $C_0$. If a similarity value $C_x$ indicates a higher similarity than the similarity value $C_0$, there is a displacement of the exit signatures in the exit list as against the entry signatures of $E_L$ to $E_{L+m}$. This points to an acquisition error of one of the two sensors 4, 5. Since, owing to the acquisition error, the value L which reflects the length of the queue also does not correspond to the actual length of the queue of the objects 8 in the predefined region 1, it is necessary to correct said value. The number of "places" of signatures in the entry list by which the exit list is displaced thereagainst corresponds in this case to the counting error of the length L of the queue.

Figure 3A:
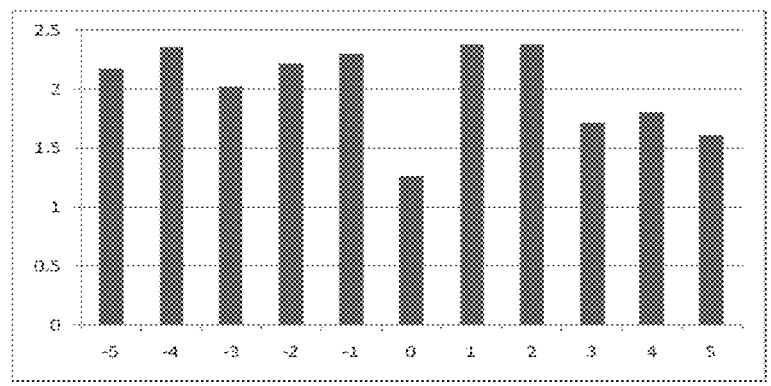
FIGS. 3a, 3b show two graphic illustrations of calculated similarity values $C_n$.

Exemplary similarity values $C_n$ obtained using the method according to the invention are illustrated graphically in FIG. 3a, $-5 \leq n \leq +5$. The algorithm used to calculate the similarity metrics yields a small value for a good correspondence between two signatures, and a large value for a poor correspondence. It is clearly to be seen in the case of the exemplary similarity values $C_n$ illustrated in FIG. 3a that the similarity value $C_0$ indicates the highest similarity. Consequently, the sequence exit signatures stored in the exit list corresponds to the sequence of the entry signatures in the entry list, and so no correction of the value L is required.

Figure 3B:
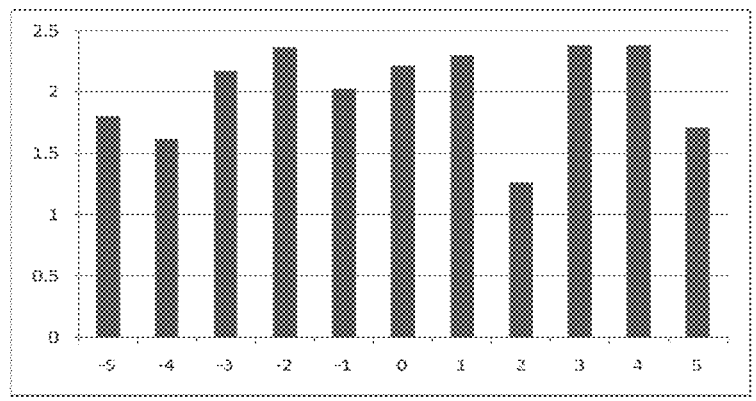

FIG. 3b shows, like FIG. 3a, a graphic illustration of exemplary similarity values $C_n$ in the case of which, however, the sequence of the exit signatures in the exit sequence are displaced by two "places" as against the entry signatures in the entry sequence. This is shown by the "better" similarity value for the similarity value $C_2$ as against the value of $C_0$. Consequently, the length L of the queue is two objects too short. The value L is corrected correspondingly by the value 2.

A correction algorithm can be used in the case of each of the above-named exemplary embodiments in order to compensate different lighting conditions at the entrance and exit. It is also possible in all the exemplary embodiments for the signatures to be calculated with the aid of a plurality of successively recorded images (frames), for example from a fusion image of the images.

The invention claimed is:

1. Method for determining the length of a queue of objects in a predefined region having at least one entrance and at least one exit, comprising the steps of:
    a) determining with the aid of at least one first image sensor a specific entry signature E of each object entering the predefined region through the at least one entrance;
    b) storing the specific entry signature E in an entry list of a calculation unit, each entry signature E being provided with an index value i reflecting the temporal sequence of the entries, and a value L reflecting the length of the queue of the objects being increased by one;
    c) determining with the aid of at least one second image sensor a specific exit signature A of an object exiting the predefined region through the at least one exit;
    d) storing the specific exit signature A in an exit list of a calculation unit as exit signature $A_0$ with index value j=0, the index value of exit signatures $A_j$ already present in the exit list respectively being increased by one, and the exit signatures $A_j$ which have an index value j that is greater than a predetermined value M being deleted from the exit list;
    e) calculating similarity values $C_n$ for $-N \leq n \leq +N$ with the aid of the calculation unit, N being a predetermined value which defines a specific number N of entry signatures of objects which, before or after the object with the entry signature $E_L$ whose exit is next expected on the basis of the length of the queue L, will exit or have already exited the predefined region, similarity metrics $U_{mn}$ respectively being calculated between an exit signature $A_m$ and an entry signature $E_{L+m+n}$, m running from 0 to M, and added to $C_n$;
    f) decrementing the value L by the value one;
    g) correcting the value L by comparing the similarity values $C_n$ with the similarity value $C_0$, and correcting the value L by adding the index value x given the presence of a value $C_x$ with index value n=x that indicates a higher similarity than the similarity value $C_0$.

2. Method according to claim 1, wherein each similarity value $C_n$ is added to a corresponding histogram value $K_n$ of a histogram list, and the new histogram value $K_n$ is stored in the histogram list, the value L being corrected only once a histogram value $K_x$ with index value n=x indicates a higher similarity than the histogram value $K_0$, by correcting the value L by adding the index value x.

3. Method according to claim 1, wherein the calculation of the similarity values $C_n$ and the correction of the value L are performed not after each acquired exit signature A, but respectively after a predetermined number of acquired exit signatures A.

4. Method according to claim 1, wherein a correction of the value L is performed only if a similarity value $C_x$ or a histogram value $K_x$ indicates a higher similarity which is at least higher by a predetermined value Q than the similarity value $C_0$ or the histogram value $K_0$, respectively.

5. Method according to claim 1, wherein the objects are people.

6. Method according to claim 1, wherein entry signatures $E_i$ and exit signatures A acquired by the image sensors are color signatures of the objects.

7. Method according to claim 6, wherein the similarity metrics $U_{mn}$ are calculated using a distance vector between the exit signature $A_m$ and the entry signature $E_i$ in a multidimensional color space.

8. Method according to claim 1, wherein the similarity metrics $U_{mn}$ are determined by an earth-movers-distance algorithm.

9. Method according to claim 1, wherein on the basis of the determined length of the queue L of the objects in the predefined region an estimated dwell time is calculated for objects newly entering the predefined region.

10. Method according to claim 1, wherein in addition to the entry signature $E_i$ the entry time $T_i$ is stored for each object entering the predefined region, and an average dwell time of the objects in the predefined region is calculated using the stored entry times $T_i$ and the exit times of the objects.

11. Method according to claim 1, wherein differences of the entry signatures $E_i$ and the exit signatures $A_m$ are compensated by a correction algorithm on the basis of different lighting conditions at the at least one entrance and at the at least one exit.

12. Device for determining the length of a queue of objects in a predefined region having at least one entrance and at least one exit in accordance with a method according to claim 1, comprising at least two image sensors, the image sensors being arranged in such a way that at least one first image sensor detects objects entering the predefined region through the at least one entrance, and at least one second image sensor detects objects exiting the predefined region through the at least one exit, and comprising at least one calculation unit which calculates the length of the queue L of the objects in the predefined region using the detected entering and exiting objects, the calculation unit or the image sensors being configured in such a way that a specific signature is determined for each entering and exiting object.

13. Device according to claim 12, wherein the image sensors are digital cameras.

14. Device according to claim 12, wherein the at least one calculation unit is integrated in at least one of the image sensors.

15. Use of a method according to claim 1 to operate a device in order to determine the length L of a queue of objects in a predefined region.

16. Method according to claim 3, wherein the calculation of the similarity values $C_n$ and the correction of the value L are performed after five, ten or fifteen acquired exit signatures A.

17. Method according to claim 4, wherein Q indicates at least a 1.5 times higher similarity.

18. Method according to claim 6, wherein entry signatures $E_i$ and exit signatures A acquired by the image sensors are color mean values of the objects.

19. Method according to claim 9, wherein the estimated dwell time is output by a display device at the entrance.

20. Method according to claim 10, wherein the estimated dwell time is output by a display device at the entrance.

* * * * *